(12) United States Patent
Mori et al.

(10) Patent No.: US 10,273,653 B1
(45) Date of Patent: Apr. 30, 2019

(54) COMPONENT SLIDING MECHANISM IN WORK VEHICLE

(71) Applicant: Kubota Corporation, Osaka-shi (JP)

(72) Inventors: Shunichiro Mori, Sakai (JP); Shinsuke Hisatake, Sakai (JP); Ryohei Hamamoto, Sakai (JP)

(73) Assignee: KUBOTA CORPORATION, Osaka-shi (JP)

( * ) Notice: Subject to any disclaimer, the term of this patent is extended or adjusted under 35 U.S.C. 154(b) by 0 days.

(21) Appl. No.: 16/015,135

(22) Filed: Jun. 21, 2018

(51) Int. Cl.
*B60K 11/04* (2006.01)
*E02F 9/08* (2006.01)

(52) U.S. Cl.
CPC ............ *E02F 9/0866* (2013.01); *B60K 11/04* (2013.01)

(58) Field of Classification Search
CPC ..................................................... B60K 11/04
See application file for complete search history.

(56) References Cited

U.S. PATENT DOCUMENTS

| 7,246,674 | B2 | 7/2007 | Andritter et al. |
| 7,401,848 | B2 | 7/2008 | Haboon et al. |
| 7,426,909 | B2 | 9/2008 | Keane et al. |
| 8,342,277 | B2 | 1/2013 | Kotani et al. |
| 2002/0139594 | A1 | 10/2002 | Gabioli |
| 2006/0213639 | A1 | 9/2006 | Kobayashi et al. |
| 2006/0219451 | A1* | 10/2006 | Schmitt .................. B60K 11/04 180/68.4 |

FOREIGN PATENT DOCUMENTS

| JP | 2000-212995 | 8/2000 |
| JP | 2002-294748 | 10/2002 |
| JP | 2004-122897 | 4/2004 |
| JP | 5184407 B2 | 9/2010 |
| JP | 5497706 B2 | 2/2013 |

* cited by examiner

*Primary Examiner* — James A Shriver, II
*Assistant Examiner* — James J Triggs
(74) *Attorney, Agent, or Firm* — Mori & Ward, LLP

(57) ABSTRACT

A component sliding mechanism in a work vehicle includes a guided portion provided on a component in the work vehicle. A support deck includes a sliding surface on which the component is provided such that the component is movable on the sliding surface along a sliding direction substantially parallel to the sliding surface. A guide track is connected to the support deck and includes a sliding direction track and a tilt direction track. The sliding direction track is to guide the guided portion to move along the sliding direction. The sliding direction track has a first end and a second end opposite to the first end in the sliding direction. The tilt direction track extends in a tilt direction from the second end to guide the guided portion to move along the tilt direction. An angle between the sliding direction track and the tilt direction track is an obtuse angle.

18 Claims, 11 Drawing Sheets

US 10,273,653 B1

COMPONENT SLIDING MECHANISM IN WORK VEHICLE

BACKGROUND OF THE INVENTION

Field of the Invention

The present invention relates to a component sliding mechanism in a work vehicle.

Discussion of the Background

Work vehicles include sliding mechanisms for components, for example, radiators of the work vehicles. The sliding mechanisms facilitate easy and speedy cleaning operations of the components and easy access by maintenance workers to other components located adjacent to the components.

SUMMARY OF THE INVENTION

In accordance with a first aspect of the present invention, a component sliding mechanism in a work vehicle includes a guided portion, a support deck, and a guide track. The guided portion is provided on a component in the work vehicle. The support deck includes a sliding surface on which the component is provided such that the component is movable on the sliding surface along a sliding direction substantially parallel to the sliding surface. The guide track is connected to the support deck. The guide track includes a sliding direction track and a tilt direction track. The sliding direction track is to guide the guided portion to move along the sliding direction. The sliding direction track has a first end and a second end opposite to the first end in the sliding direction. The tilt direction track extends in a tilt direction from the second end to guide the guided portion to move along the tilt direction. An angle between the sliding direction track and the tilt direction track is an obtuse angle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
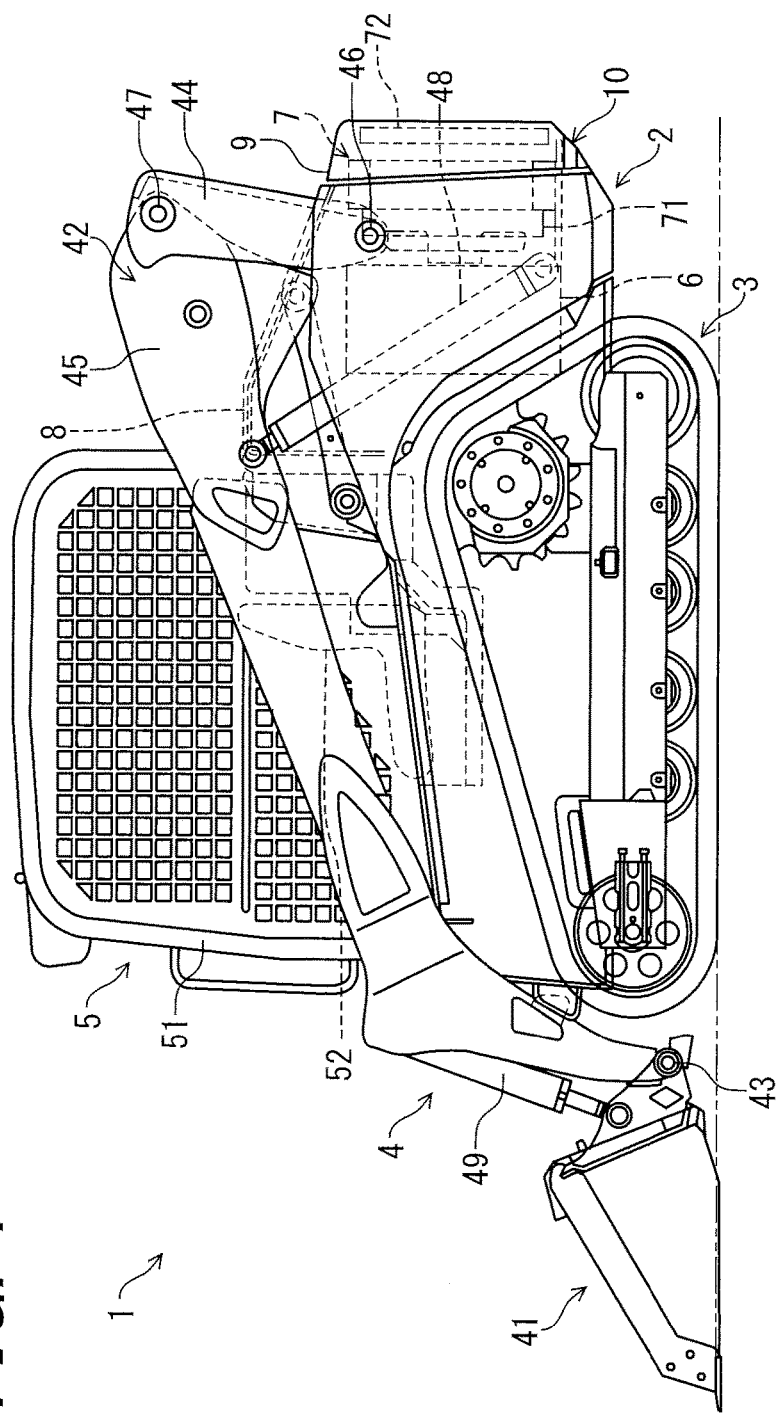
FIG. 1 is an overall side view of a work vehicle.

The embodiment(s) will now be described with reference to the accompanying drawings, wherein like reference numerals designate corresponding or identical elements throughout the various drawings.

Referring to FIG. 1, a work vehicle 1, for example, a compact track loader, includes a component sliding mechanism 10 in accordance with a first embodiment. The work vehicle 1 includes a main frame 2, a traveling apparatus 3, a work device 4, and a cabin 5. The main frame 2 supports the traveling apparatus 3, the work device 4, and the cabin 5. In the illustrated embodiment, the traveling apparatus 3 is a crawler type traveling device. However, the traveling apparatus 3 is not limited to the crawler type traveling device. The traveling apparatus 3 may be, e.g., a front/rear wheel traveling device or a traveling device having a front wheel and a rear crawler. The work device 4 includes an implement (a bucket) 41 at a distal end of the work device 4. A proximal end of the work device 4 is mounted at a rear portion of the main frame 2. The work device 4 includes a pair of arms 42 to rotatably support the bucket 41 via a bucket pivot axis 43. Each of the pair of arms 42 includes a lift link 44 and a boom 45. The lift link 44 is rotatable with respect to the main frame 2 around a first pivot pin 46. The boom 45 is rotatable with respect to the lift link 44 around a second pivot pin 47. The work device 4 further includes boom cylinders 48 and at least one implement cylinder 49. Each of the boom cylinders 48 is rotatably connected to the main frame 2 and the boom 45 to move the lift link 44 and the boom 45 to lift up and down the implement 41. The at least one implement cylinder 49 is configured to tilt the implement 41. The cabin 5 is mounted on a front portion of the main frame 2. The work vehicle 1 includes a front door 51 at the front of the cabin 5 and a driver's seat 52 and operating devices (not shown) inside the cabin 5.

In the illustrated embodiment, one of the pair of arms 42 is provided to the left of the cabin 5. The other of the pair of the arms 42 is provided to the right of the cabin 5. More specifically, one of the boom cylinders 48 and one of the booms 45 are provided to the left of the cabin 5. The other of the boom cylinders 48 and the other of the booms 45 are provided to the right of the cabin 5. FIG. 1 illustrates a left side of the work vehicle 1. However, the left side and the right side of the work vehicle 1 are substantially bilaterally symmetric.

The work vehicle 1 further includes an engine 6 and a cooling unit 7 that are provided at the rear portion of the main frame 2. The engine 6 is configured to provide driving force to the traveling apparatus 3 and the work device 4. The cooling unit 7 includes a radiator configured to cool a coolant of the engine 6. Further, preferably, the cooling unit 7 includes an oil cooler configured to cool hydraulic oil used in a hydraulic system (e.g. the boom cylinders 48 and the at least one implement cylinder 49) in the work vehicle 1. The cooling unit 7 further includes a fan shroud 71 and an auxiliary cooler unit 72. The fan shroud 71 includes a cooling fan. Accordingly, the cooling unit 7 includes a fan provided on the radiator. The auxiliary cooler unit 72 is for example, an air conditioner. The auxiliary cooler unit 72 may be omitted from the cooling unit 7 and provided at a different place in the work vehicle 1. The auxiliary cooler unit 72 may include the oil cooler. The engine 6 and the cooling unit 7 are provided between the pair of the arms 42 in the left-right direction (a side direction D2, see FIGS. 3 and 4) of the work vehicle 1. The engine 6 and the cooling unit 7 are provided between the boom cylinders 48 in the left-right direction of the work vehicle 1.

The work vehicle 1 further includes a room cover 8 and a hood 9. The room cover 8 covers the engine 6 and a front portion of the cooling unit 7. The hood 9 is provided at the rear end of the main frame 2 to cover at least part of the cooling unit 7. The hood 9 is openable such that the cooling unit 7 is movable rearward such that a maintenance person can conduct maintenance work for the cooling unit 7 and the engine 6. In the following description, the cooling unit 7 are referred to as a component 7. The work vehicle 1 includes a component sliding mechanism 10 which facilitates work for moving the component 7.

Figure 2:
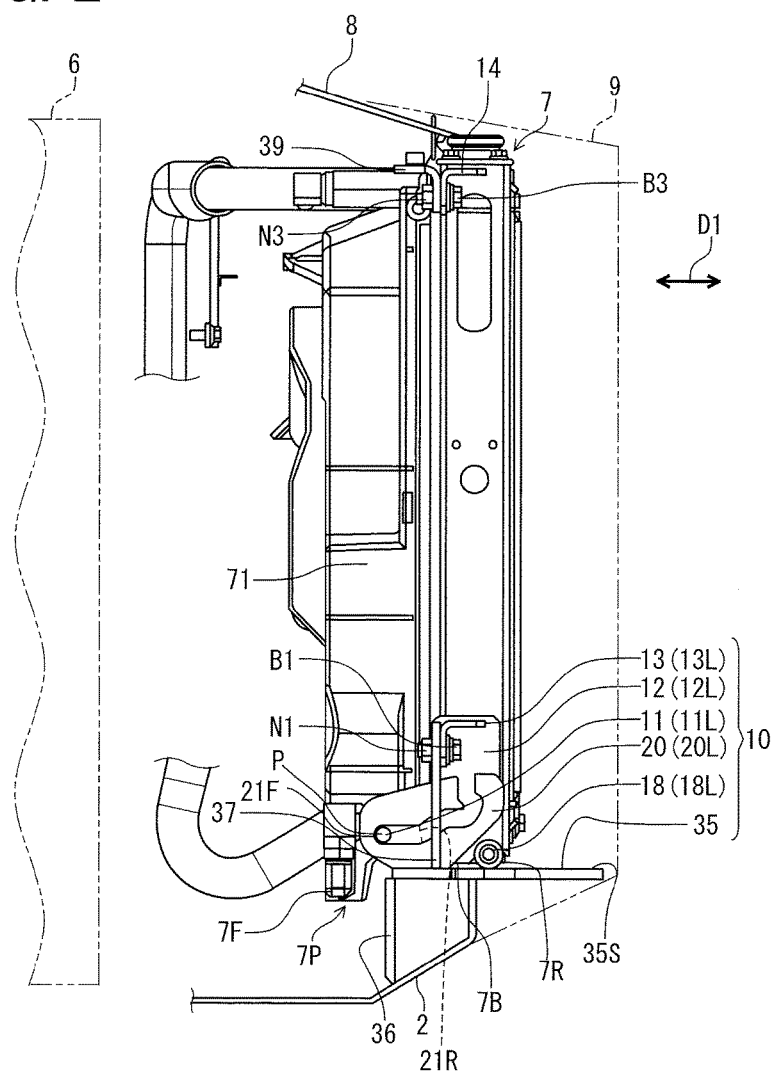
FIG. 2 is a side view of a component and a component sliding mechanism in the work vehicle in accordance with a first embodiment.

As seen in FIG. 2, the component sliding mechanism 10 includes a guided portion 11, a support deck 35, and a guide track 20. The guided portion 11 is provided on the component 7 in the work vehicle 1. The guided portion 11 includes a pin P. Alternatively, the guided portion 11 may include a different structure such as a roller. In the illustrated embodiment, the guided portion 11 is mounted on the component 7 via a mounting portion 12. That is, the component sliding mechanism 10 includes the mounting portion 12 to mount the guided portion 11 to the component 7. The guided portion 11 is connected to the mounting portion 12, for example, by welding. Alternatively, the guided portion 11 may be directly connected to the component 7. The support deck 35 is provided on the main frame 2. The work vehicle 1 further includes a support frame 36 to support a front portion of the support deck 35. The support deck 35 is supported by the main frame 2 and the support frame 36. The support deck 35 includes a sliding surface 35S on which the component 7 is provided such that the component 7 is movable on the sliding surface 35S along a sliding direction D1 substantially parallel to the sliding surface 35S. Preferably, the sliding direction D1 is substantially parallel to the front-rear direction of the work vehicle 1. The guide track 20 is connected to the support deck 35. More specifically, the guide track 20 is separatably connected to the support deck 35. Alternatively, the guide track 20 may be fixed to the support deck 35, for example, by welding.

Figure 3:
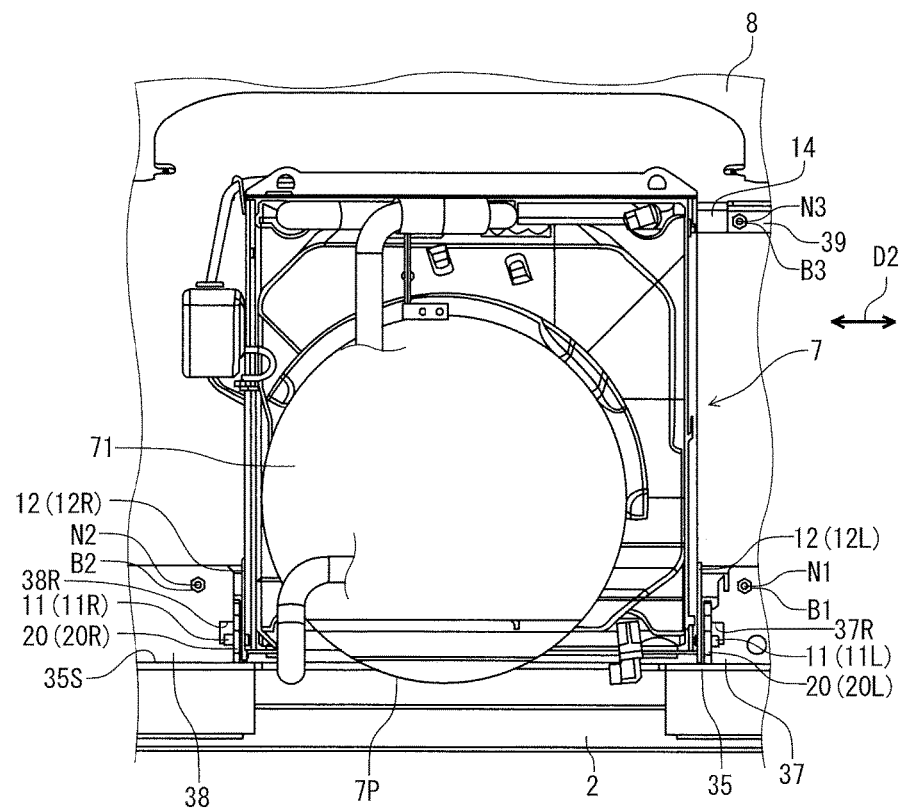
FIG. 3 is a front view of the component and the component sliding mechanism in the work vehicle which are shown in FIG. 2.
Figure 4:
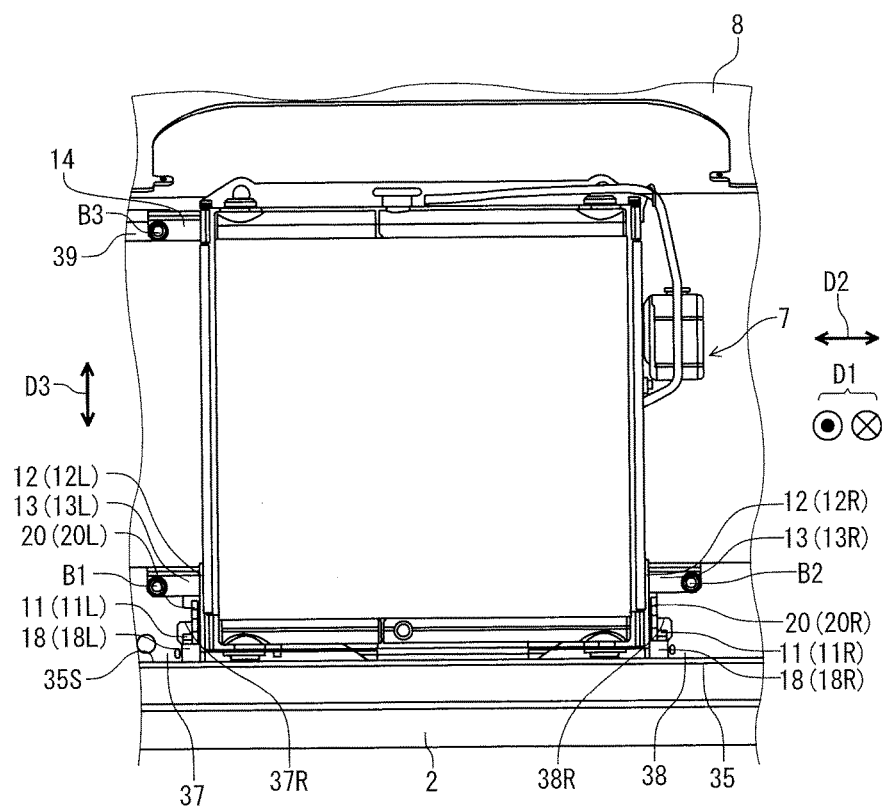
FIG. 4 is a rear view of the component and the component sliding mechanism in the work vehicle which are shown in FIG. 2.

Specifically, as seen in FIGS. 3 and 4, the component sliding mechanism 10 includes two guided portions 11L and 11R, two mounting portions 12L and 12R, and two guide tracks 20L and 20R. The guided portions 11L and 11R are collectively referred to the guided portion 11. The mounting portions 12L and 12R are collectively referred to the mounting portion 12. The guide tracks 20L and 20R are collectively referred to as the guide track 20. The mounting portion 12L is provided on a left side of the component 7. The guided portion 11L is provided on the mounting portion 12L. The mounting portion 12R is provided on a right side of the component 7. The guided portion 11R is provided on the mounting portion 12R. The guide track 20L is provided on the guided portion 11L. The guide track 20L is provided adjacent to the mounting portion 12L. The guide track 20R is provided on the guided portion 11R. The guide track 20R is provided adjacent to the mounting portion 12R. The component 7 is sandwiched between the guided portions 11L and 11R in a side direction D2 that is perpendicular to the sliding direction D1. The guided portions 11L and 11R are sandwiched between the guide tracks 20L and 20R in the side direction D2. Accordingly, the component 7 is movable on the sliding surface 35S along the sliding direction D1. Preferably, the side direction D2 is substantially parallel to the left-right direction of the work vehicle 1.

As seen in FIG. 2, the component sliding mechanism 10 further includes a roller 18 provided on the component 7 to move the component 7 in the sliding direction D1 on the sliding surface 35S. As seen in FIG. 4, the component sliding mechanism 10 includes two rollers 18L and 18R. The rollers 18L and 18R are collectively referred to as the roller 18. In the illustrated embodiment, the roller 18 is connected to the component 7 via the mounting portion 12. Alternatively, the roller 18 may be directly connected to the component 7. Further, the roller 18 may be omitted in a case where the component 7 is slidable on the sliding surface 35S.

As seen in FIG. 2, the component 7 has a component bottom surface 7B facing the sliding surface 35S. The component bottom surface 7B has a first edge 7F and a second edge 7R opposite to the first edge 7F in the sliding direction D1. The component 7 is provided in the work vehicle 1 such that the first edge 7F is closer to the engine 6 than the second edge 7R. The guided portion 11 is provided on the component 7 closer to the first edge 7F than to the second edge 7R in the sliding direction D1. On the other hand, the roller 18 is closer to the second edge 7R than to the first edge 7F in the sliding direction D1. Alternatively, the roller 18 may be provided in a different position between the first edge 7F and the second edge 7R in the sliding direction D1. As seen in FIG. 4, the roller 18 is provided on the component 7 such that the roller 18 overlaps with the guide track 20 viewed in the sliding direction D1.

As seen in FIGS. 2 to 4, in order to securely fasten the component 7 to the main frame 2 when the work vehicle 1 is in operation, the component sliding mechanism 10 further includes a component installation projection 13 protruding from the mounting portion 12 in the side direction D2. More specifically, the component sliding mechanism 10 further includes two component installation projections 13L and 13R. The component installation projections 13L and 13R are collectively referred to as the component installation projection 13. The component installation projection 13L is connected to the mounting portion 12L, for example, by welding. The component installation projection 13R is connected to the mounting portion 12R, for example, by welding. Alternatively, the mounting portion 12 and the component installation projection 13 may be manufactured by bending a metal plate. The component installation projection 13L is detachably attached to a bottom left installation frame 37, when the component 7 is fastened to the main frame 2. More specifically, the component installation projection 13L is attached to the bottom left installation frame 37 with a bolt B1 and a nut N1. The bottom left installation frame 37 is connected to the main frame 2. The component installation projection 13R is detachably attached to a bottom right installation frame 38, when the component 7 is fastened to the main frame 2. More specifically, the component installation projection 13R is attached to the bottom right installation frame 38 with a bolt B2 and a nut N2. The bottom right installation frame 38 is connected to the main frame 2.

Further, an additional installation portion 14 is mounted on a top left portion of the component 7. The additional installation portion 14 is provided above the component installation projections 13 in a height direction D3 along a height of the work vehicle 1 in a state where the component 7 is installed in the work vehicle 1. The additional installation portion 14 protrudes in the side direction D2. The additional installation portion 14 is detachably attached to a top left installation frame 39, when the component 7 is fastened to the main frame 2. More specifically, the additional installation portion 14 is attached to the top left installation frame 39 with a bolt B3 and a nut N3. The top left installation frame 39 is connected to the main frame 2.

Figure 5:
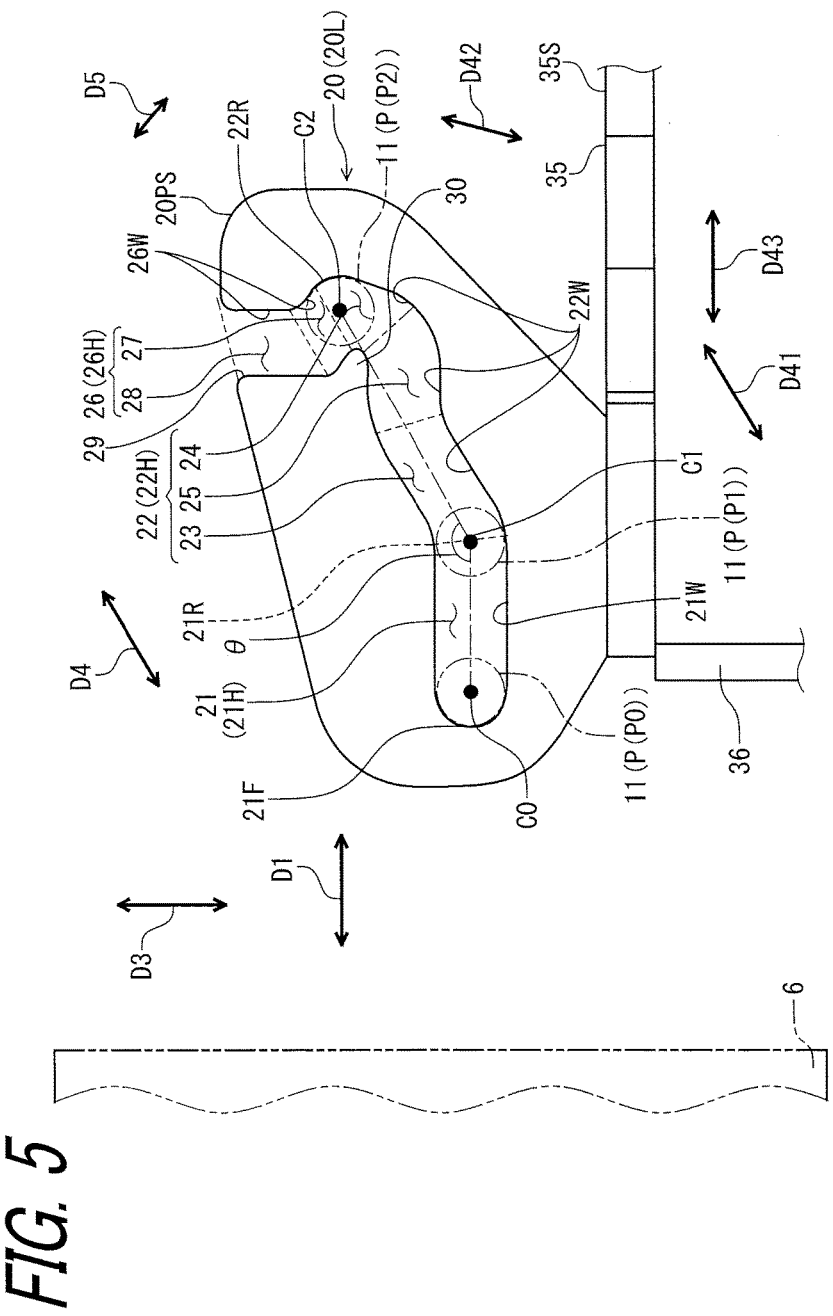
FIG. 5 is an enlarged view of a guide track shown in the FIG. 2.

FIG. 5 is an enlarged view of the guide track 20L and the devices adjacent to the guide track 20L. The guide tracks 20L and 20R have bilateral symmetrical structures. Accordingly, the explanation of the structure of the guide track 20R is omitted. As seen in FIG. 5, the guide track 20 includes a sliding direction track 21 and a tilt direction track 22. The sliding direction track 21 is to guide the guided portion 11 to move along the sliding direction D1. More specifically, the sliding direction track 21 includes a first hole 21H through which the pin P included in the guided portion 11 is configured to pass. A peripheral wall 21W of the first hole 21H is configured to abut against the pin P when the guided portion 11 is moved in the sliding direction track 21. Alternatively, the sliding direction track 21 may include a guide rail or a groove to abut against the pin P in place of a through hole like the first hole 21H. The sliding direction track 21 has a first end 21F and a second end 21R opposite to the first end 21F in the sliding direction D1. The first end 21F is provided between the engine 6 and the second end 21R in the sliding direction D1. Further, as seen in FIG. 2, the first edge 7F of the component 7 is closer to the first end 21F than to the second end 21R when the guided portion 11 is positioned at the first end 21F. FIG. 5 shows the centers C0 and C1 of the guided portions 11 each of which are positioned at the first end 21F and the second end 21R, respectively. The segment C0C1 extends in the sliding direction D1.

As seen in FIG. 5, the tilt direction track 22 extends in a tilt direction D4 from the second end 21R to guide the guided portion 11 to move along the tilt direction D4. More specifically, the tilt direction track 22 includes a second hole 22H through which the pin P included in the guided portion 11 is configured to pass. A peripheral wall 22W of the second hole 22H is configured to abut against the pin P when the guided portion 11 is moved in the tilt direction track 22. Alternatively, the tilt direction track 22 may include a guide rail or a groove to abut against the pin P in place of a through hole like the second hole 22H. The tilt direction track 22 has a third end 22R opposite to the second end 21R in the tilt direction D4. FIG. 5 shows the center C2 of the guided portion 11 positioned at the third end 22R. The tilt direction track 22 includes a first tilt section 23, a second tilt section 24, and a middle section 25. The first tilt section 23 is connected to the second end 21R and extends in a first tilting direction D41. The second tilt section 24 is connected to the third end 22R and extends in a second tilting direction D42. The second tilting direction D42 is more inclined than the first tilting direction D41 with respect to the sliding direction D1. The middle section 25 is provided between the first tilt section 23 and the second tilt section 24 and extends in a gentler direction D43 than the first tilting direction D41 and the second tilting direction D42. The middle section 25 can prevent the component 7 from being rapidly tilted to securely guide the guided portion 11 to the third end 22R when the guided portion 11 is moved backward thoroughly in the tilt direction track 22. Here, in a state where the tilt direction track 22 having several sections extending in different tilting directions as shown in FIG. 5, the tilt direction D4 is a direction in which the segment C1C2 extends. Further an angle θ between the sliding direction track 21 and the tilt direction track 22 is defined as an angle made by the segment C0C1 and the segment C1C2. Specifically, in this embodiment, the angle θ between the sliding direction track 21 and the tilt direction track 22 is an obtuse angle.

In the illustrated embodiment, the guide track 20 further includes an ejection guide track 26 extending from the third end 22R of the tilt direction track 22 to a peripheral surface 20PS of the guide track 20 such that the third end 22R is a switch-back point between the tilt direction track 22 and the ejection guide track 26. The ejection guide track 26 may be omitted in the guide track 20. More specifically, the ejection guide track 26 includes a third hole 26H through which the pin P included in the guided portion 11 is configured to pass. A peripheral wall 26W of the third hole 26H is configured to abut against the pin P when the guided portion 11 is moved in the ejection guide track 26. The peripheral surface 20PS of the guide track 20 has an opening 29 connected to the third hole 26H through which the guided portion 11 is ejected from the guide track 20. Alternatively, the ejection guide track 26 may include a guide rail or a groove to abut against the pin P in place of a through hole like the third hole 26H. The ejection guide track 26 includes a third tilt section 27 and an upright section 28. The third tilt section 27 extends from the third end 22R in a third tilting direction D5 such that the tilt direction track 22 and the third tilt section 27 constitutes a V-shape. More specifically, the second tilt section 24 and the third tilt section 27 constitutes a V-shape. The upright section 28 extends in the height direction D3 from the third tilt section 27 to the peripheral surface 20PS of the guide track 20. The guide track 20 has a projection 30 provided between the second hole 22H and the third hole 26H in the height direction D3 and extends along the sliding direction D1. Accordingly, the guide track 20 can prevent the guided portion 11 from being guided from the second hole 22H to the third hole 26H without being guided to the third end 22R.

Figure 6:
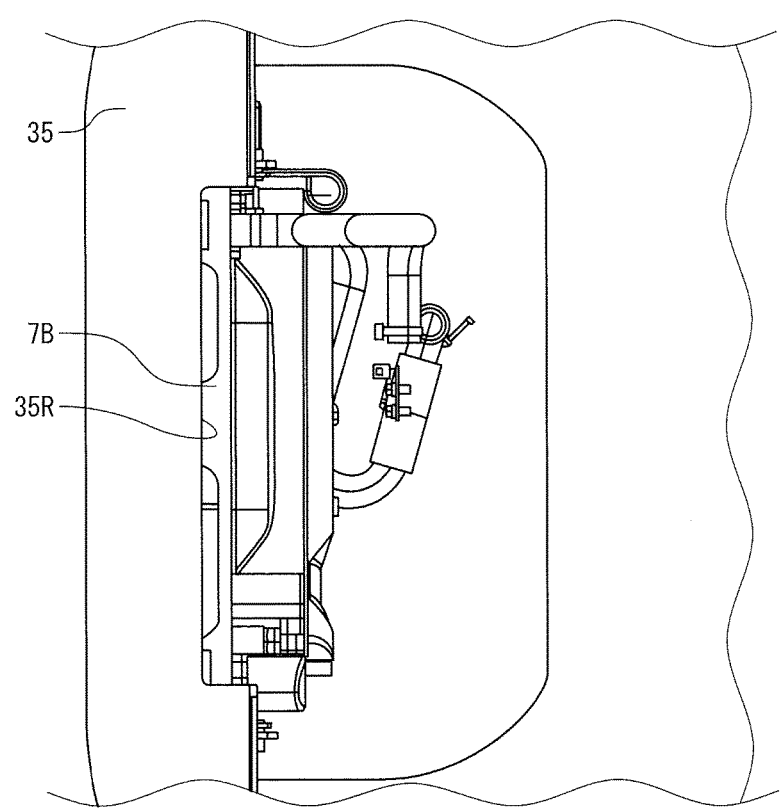
FIG. 6 is a bottom view of the component and the component sliding mechanism in the work vehicle which are shown in FIG. 2.

As described above, the component 7 slides in the sliding direction D1 when the guided portion 11 is moved in the sliding direction track 21. Here, as seen in FIG. 2, the component 7 has a protrusion 7P protruding downward from the component bottom surface 7B. In order to prevent the protrusion 7P from colliding with the support deck 35, as seen in FIG. 6, the support deck 35 has a recess 35R dented backward.

Figure 7:
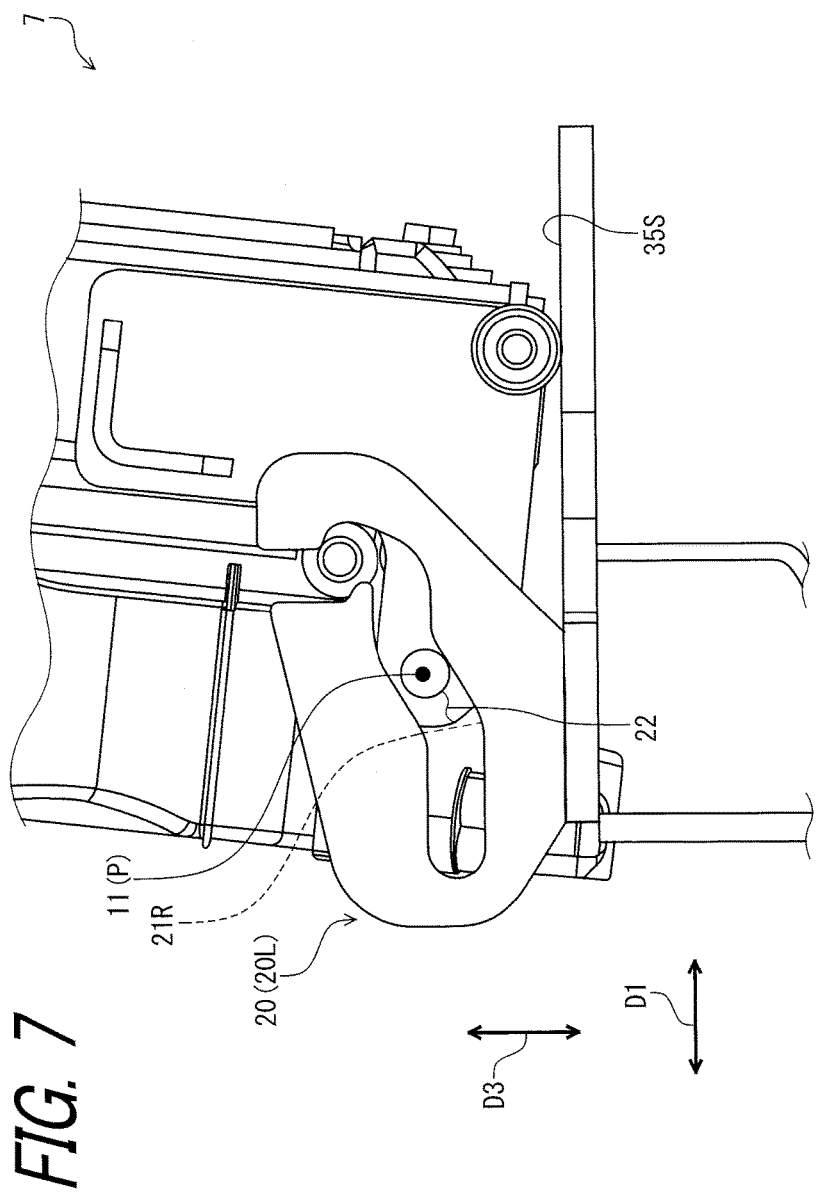
FIG. 7 is a partial enlarged view illustrating the component and the component sliding mechanism when the guided portion is in the tilt direction track.

Further, the guided portion 11 is mounted on the component 7 via the mounting portion 12 such that the guided portion 11 is stationary with respect to the component 7 when the component slides on the support deck 35. In addition, as seen in FIG. 5, the angle θ between the sliding direction track 21 and the tilt direction track 22 is an obtuse angle, and the guided portion 11 is provided closer to the first edge 7F than to the second edge 7R in the sliding direction D1. Accordingly, as seen in FIG. 7, as the guided portion 11 is moved backward in the tilt direction track 22, the component 7 is gradually tilted backward. As shown in FIGS. 2 to 4, when the guided portions 11L and 11R are moved in the tilt direction track 22 of the guide tracks 20L and 20R, the guided portions 11L and 11R are configured to pass through the bottom left installation frame 37 and the bottom right installation frame 38. Accordingly, the bottom left installation frame 37 and the bottom right installation frame 38 have frame recesses 37R and 38R through which the guided portions 11L and 11R are configured to pass.

Figure 8:
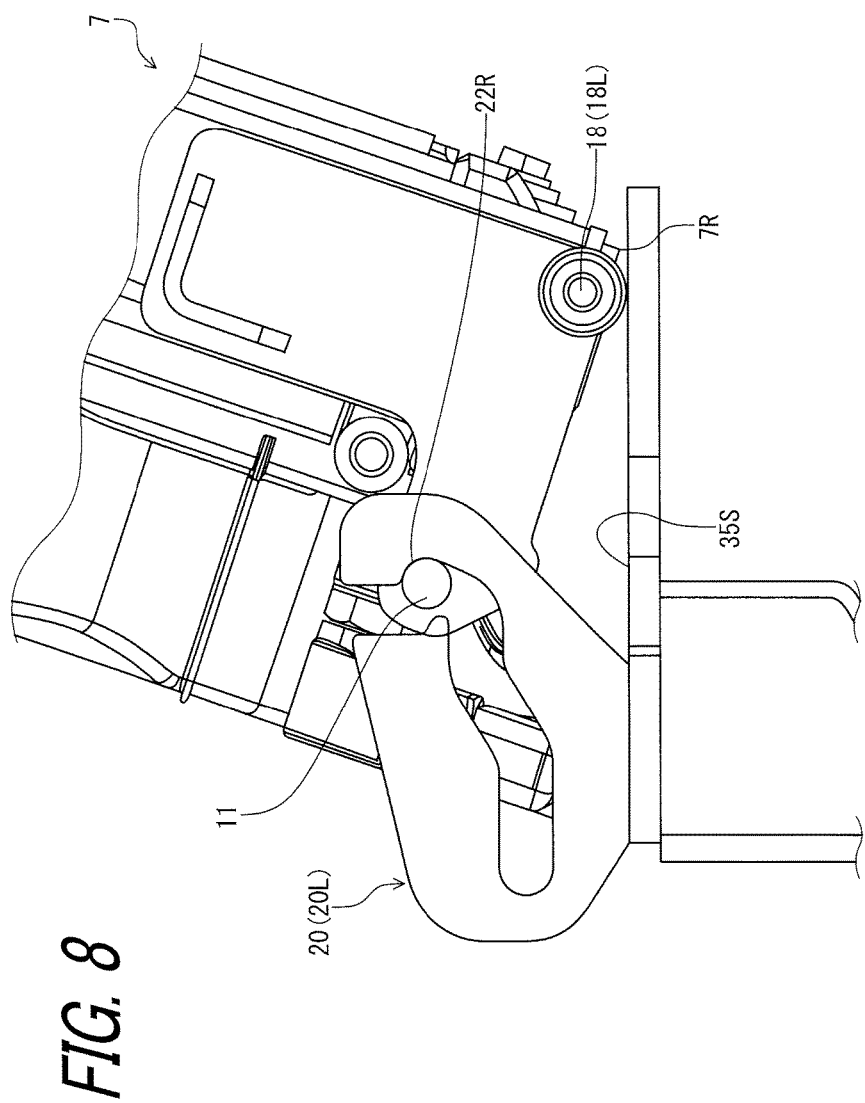
FIG. 8 is a partial enlarged view illustrating the component and the component sliding mechanism when the guided portion is positioned at the third end.

As described above, when the guided portion 11 is moved backward thoroughly in the tilt direction track 22, the guided portion 11 is securely guided to the third end 22R. As shown in FIG. 8, the second edge 7R of the component 7 is not in contact with the sliding surface 35S when the guided portion 11 is positioned at the third end 22R of the guide track 20 in a state the roller 18 is provided on the sliding surface 35S. Accordingly, the component 7 can be smoothly moved with the roller 18 such that the guided portion 11 is guided to the third end 22R.

Figure 9:
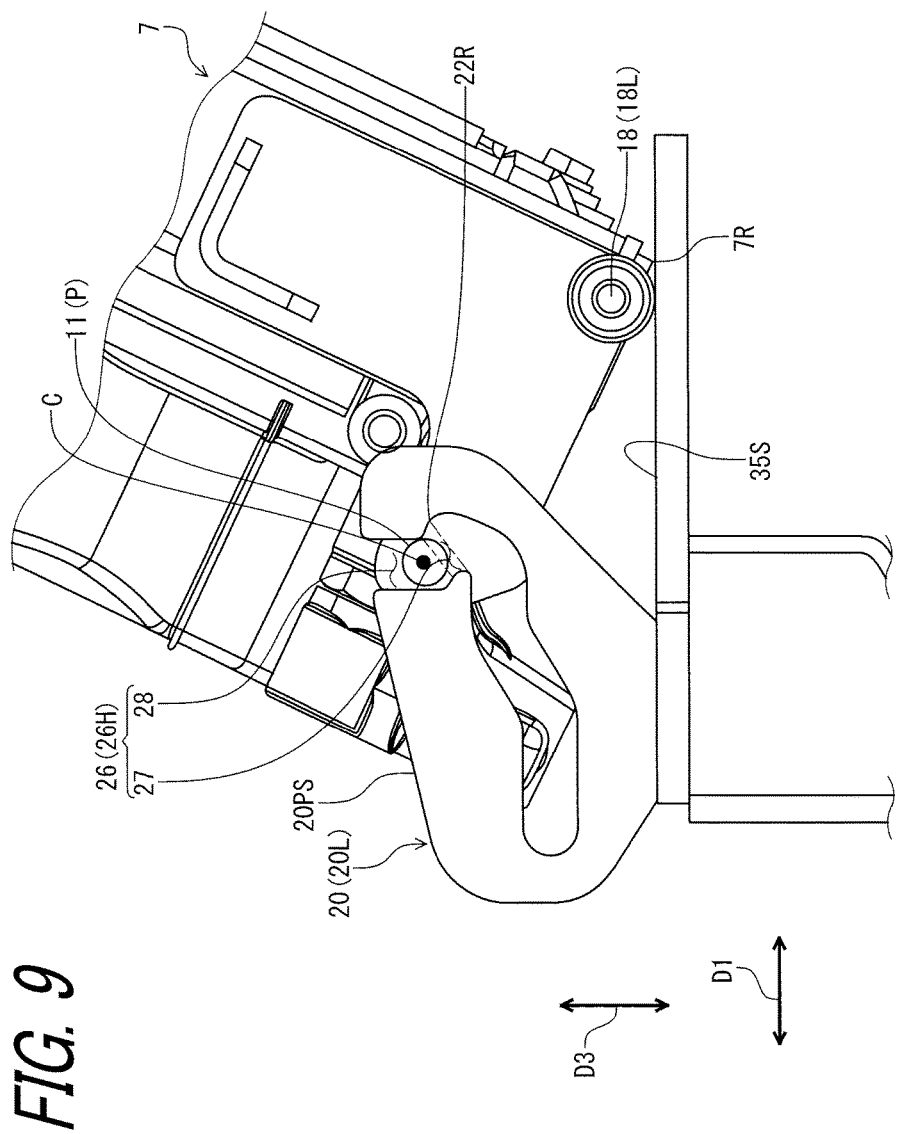
FIG. 9 is a partial enlarged view illustrating the component and the component sliding mechanism when the guided portion is in the ejection guide track.

As shown in FIG. 9, the second edge 7R of the component 7 is in contact with the sliding surface 35S when the guided portion 11 is positioned between the third end 22R and the peripheral surface 20PS of the guide track 20 in the ejection guide track 26 in a state where the roller 18 is provided on the sliding surface 35S. In this state, as seen in FIG. 9, the center C of the guided portion 11 (the pin P) is preferably provided in the upright section 28. Accordingly, it is possible to eject the guided portion 11 from the guide track 20 by simply lifting the component 7 up in the height direction D3.

In this embodiment, the angle θ between the sliding direction track 21 and the tilt direction track 22 is an obtuse angle. Accordingly, as seen in FIG. 7, a maintenance worker can tilt the component 7 backward by simply moving the guided portion 11 is in the sliding direction D1 without pulling and inclining the component 7 downward. Therefore, the component sliding mechanism 10 can facilitate easy and speedy cleaning operation of the component 7.

A component sliding mechanism 110 including a guide track 120 in accordance with a second embodiment will be described below referring to FIG. 10. The component sliding mechanism 110 has a similar structure and/or configuration to those of the component sliding mechanism 10 except for the guide track 120. Thus, elements having substantially similar function as those in the first embodiment will be numbered the same here and will not be described and/or illustrated again in detail here for the sake of brevity.

Figure 10:
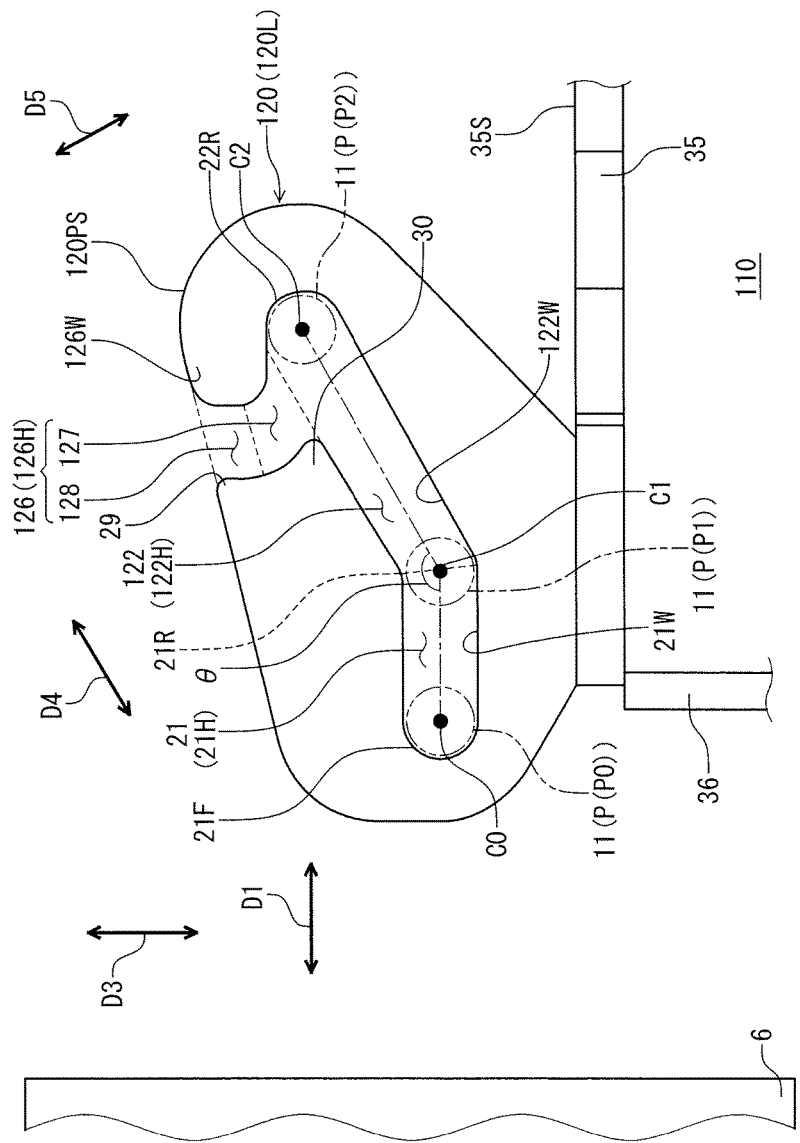
FIG. 10 is an enlarged view of a guide track shown in accordance with a second embodiment.

FIG. 10 is an enlarged view of the guide track 120L and the devices adjacent to the guide track 120L. The guide track 120L and a right-sided guide track (not shown) in this embodiment are bilaterally symmetrical. Accordingly, the explanation of the right-sided guide track is omitted. The guide track 120L and a right-sided guide track are collectively referred to as the guide track 120. As seen in FIG. 10, the guide track 120 includes the sliding direction track 21 and a tilt direction track 122. The tilt direction track 122 is different from the tilt direction track 22 in the first embodiment in that the tilt direction track 122 has a straight shape. The tilt direction track 122 includes a second hole 122H through which the pin P included in the guided portion 11 is configured to pass. A peripheral wall 122W of the second hole 122H is configured to abut against the pin P when the guided portion 11 is moved in the tilt direction track 122. Alternatively, the tilt direction track 122 may include a guide rail or a groove to abut against the pin P in place of a through hole like the second hole 122H.

In the second embodiment, the guide track 120 further includes an ejection guide track 126 extending from the third end 22R of the tilt direction track 122 to a peripheral surface 120PS of the guide track 120 such that the third end 22R is a switch-back point between the tilt direction track 122 and the ejection guide track 126. The ejection guide track 126 may be omitted in the guide track 120. More specifically, the ejection guide track 126 includes a third hole 126H through which the pin P included in the guided portion 11 is configured to pass. A peripheral wall 126W of the third hole 126H is configured to abut against the pin P when the guided portion 11 is moved in the ejection guide track 126. The peripheral surface 120PS of the guide track 120 has an opening 29 connected to the third hole 126H through which the guided portion 11 is ejected from the guide track 120. Alternatively, the ejection guide track 126 may include a guide rail or a groove to abut against the pin P in place of a through hole like the third hole 126H. The ejection guide track 126 includes a third tilt section 127 and an upright section 128. The third tilt section 127 is different from the third tilt section 27 in the first embodiment in that the third tilt section 127 is farther from the third end 22R than the third tilt section 27 in the sliding direction D1. This structure can restrain unintended ejection of the guided portion 11. The upright section 128 is different from the upright section 28 in that a height of the upright section 128 is smaller than a height of the upright section 28. Accordingly, it is possible to eject the guided portion 11 from the guide track 120 by lifting the component 7 up in a smaller height in the height direction D3. The component sliding mechanism 110 including the guide track 120 can provide a substantially similar effect to that of the component sliding mechanism 10.

A component sliding mechanism 210 including a guide track 220 in accordance with a third embodiment will be described below referring to FIG. 11. The component sliding mechanism 210 has a similar structure and/or configuration to those of the component sliding mechanism 110 except for the guide track 220. Thus, elements having substantially similar function as those in the first embodiment will be numbered the same here and will not be described and/or illustrated again in detail here for the sake of brevity.

Figure 11:
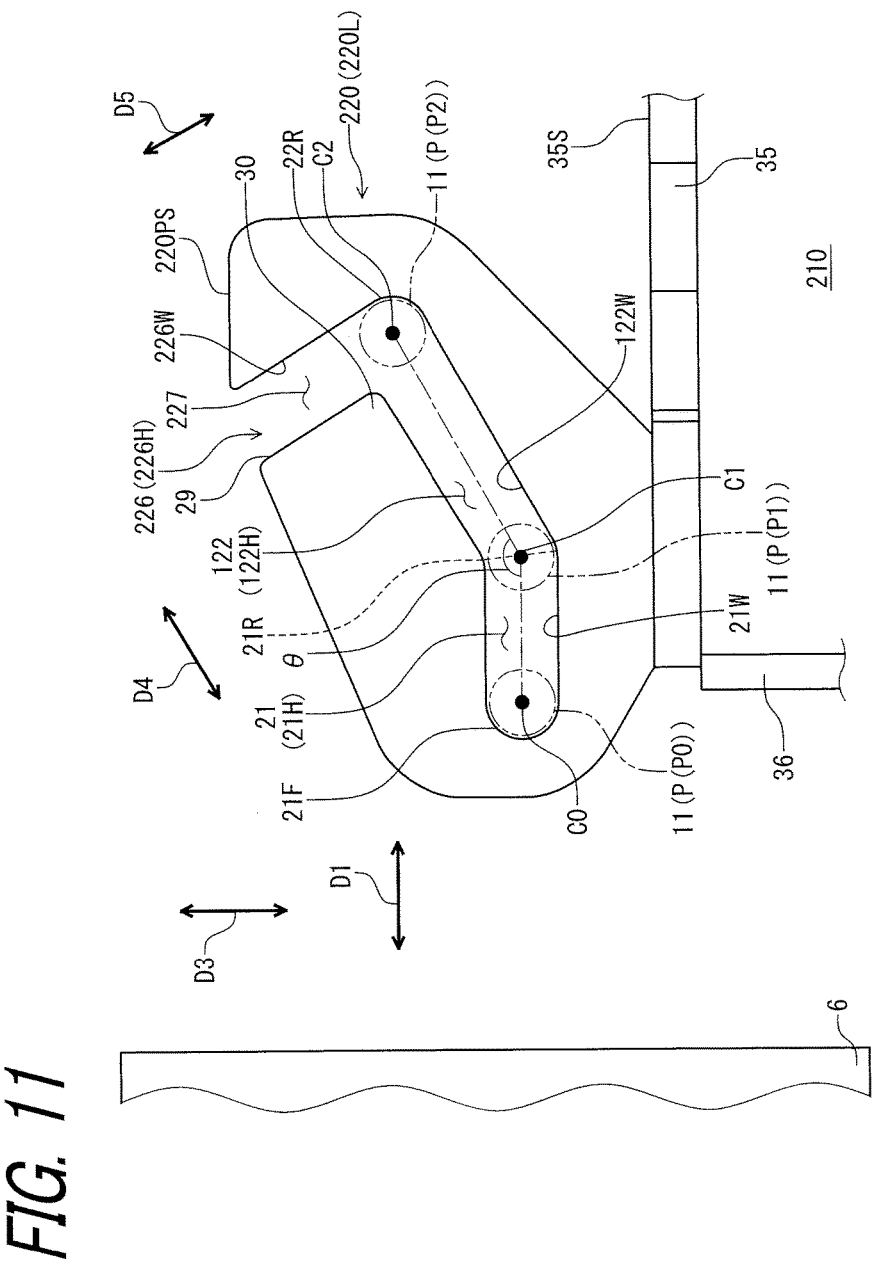
FIG. 11 is an enlarged view of a guide track shown in accordance with a third embodiment.

FIG. 11 is an enlarged view of the guide track 220L and the devices adjacent to the guide track 220L. The guide track 220L and a right-sided guide track (not shown) in this embodiment are bilaterally symmetrical. Accordingly, the explanation of the right-sided guide track is omitted. The guide track 220L and the right-sided guide track are referred to as the guide track 220. As seen in FIG. 11, the guide track 220 includes the sliding direction track 21 and the tilt direction track 122. The guide track 220 further includes an ejection guide track 226 extending from the third end 22R of the tilt direction track 122 to a peripheral surface 220PS of the guide track 220 such that the third end 22R is a switch-back point between the tilt direction track 122 and the ejection guide track 226. More specifically, the ejection guide track 226 includes a third hole 226H through which the pin P included in the guided portion 11 is configured to pass. A peripheral wall 226W of the third hole 226H is configured to abut against the pin P when the guided portion 11 is moved in the ejection guide track 226. The peripheral surface 220PS of the guide track 220 has an opening 29 connected to the third hole 226H for ejecting the guided portion 11 from the guide track 220. Alternatively, the ejection guide track 226 may include a guide rail or a groove to abut against the pin P in place of a through hole like the third hole 226H. The ejection guide track 226 is different from the ejection guide track 126 in that the ejection guide track 226 has a straight shape. Accordingly, the ejection guide track 226 includes only a third tilt section 227, which extends in the third tilting direction D5. The component sliding mechanism 210 including the guide track 220 can provide a substantially similar effect to those of the component sliding mechanisms 10 and 110.

In the above embodiments, the guided portion 11 includes the pin P or a first alternative structure such as a roller, whereas the guide track 20 includes the first to third holes 21H, 22H, 122H, 26H, 126H, and 226H or a second alternative structure such as a groove or a guide rail as explained above. However, the guided portion 11 may include the first to third holes 21H, 22H, 122H, 26H, 126H, and 226H or the second alternative structure, and the guide track 20 may include the pin P or the first alternative structure.

In the above embodiments, the work vehicle 1 is a compact track loader. However, the component sliding mechanism 10, 110, or 210 can be applied to another work vehicle such as a backhoe such that the engine 6 and the cooling unit 7 are mounted on the main frame 2 along the side direction D2, with the cooling unit 7 being movable in the side direction D2. Further, the fan shroud 71 can be attached to the engine 6 instead of the cooling unit 7.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A component sliding mechanism in a work vehicle, comprising:
    a guided portion provided on a component in the work vehicle;
    a support deck including a sliding surface on which the component is provided such that the component is movable on the sliding surface along a sliding direction substantially parallel to the sliding surface; and
    a guide track connected to the support deck and comprising:
        a sliding direction track to guide the guided portion to move along the sliding direction, the sliding direction track having a first end and a second end opposite to the first end in the sliding direction; and
        a tilt direction track extending in a tilt direction from the second end to guide the guided portion to move along the tilt direction, an angle between the sliding direction track and the tilt direction track being an obtuse angle.

2. The component sliding mechanism according to claim 1,
    wherein the component has a component bottom surface facing the sliding surface,
    wherein the component bottom surface has a first edge and a second edge opposite to the first edge in the sliding direction,
    wherein the guided portion is provided on the component such that a distance between the guided portion and the first edge in the sliding direction is smaller than a distance between the guided portion and the second edge in the sliding direction, and
    wherein the first edge is closer to the first end than to the second end when the guided portion is positioned at the first end.

3. The component sliding mechanism according to claim 2, further comprising:
    a roller provided on the component to move the component in the sliding direction on the sliding surface.

4. The component sliding mechanism according to claim 3,
    wherein the roller is provided between the first edge and the second edge in the sliding direction, and
    wherein the roller is closer to the second edge than to the first edge in the sliding direction.

5. The component sliding mechanism according to claim 1, wherein the guided portion is separatably connected to the component.

6. The component sliding mechanism according to claim 5, wherein the guided portion is stationary with respect to the component when the component slides on the support deck.

7. The component sliding mechanism according to claim 3,
    wherein the tilt direction track has a third end opposite to the second end in the tilt direction.

8. The component sliding mechanism according to claim 7, wherein the guide track further comprises an ejection guide track extending from the third end of the tilt direction track to a peripheral surface of the guide track such that the third end is a switch-back point between the tilt direction track and the ejection guide track.

9. The component sliding mechanism according to claim 8, wherein the tilt direction track comprises
    a first tilt section connected to the second end and extending in a first tilting direction,
    a second tilt section connected to the third end and extending in a second tilting direction, and
    a middle section provided between the first tilt section and the second tilt section, the middle section and extending in a gentler direction than the first tilting direction and the second tilting direction.

10. The component sliding mechanism according to claim 9,
    wherein the sliding direction track includes a first hole,
    wherein the tilt direction track includes a second hole,
    wherein the ejection guide track includes a third hole,
    wherein the peripheral surface of the guide member has an opening connected to the third hole, and
    wherein the guided portion includes a pin configured to pass through the first hole, the second hole, and the third hole.

11. The component sliding mechanism according to claim 10, wherein the guide track has a projection provided between the second hole and the third hole in a height direction along a height of the work vehicle and extending along the sliding direction.

12. The component sliding mechanism according to claim 7, wherein the second edge of the component is not in contact with the sliding surface when the guided portion is positioned at the third end of the guide track in a state where the roller is provided on the sliding surface.

13. The component sliding mechanism according to claim 8, wherein the second edge of the component is in contact with the sliding surface when the guided portion is positioned between the third end and the peripheral surface of the guide track in the ejection guide track in a state where the roller is provided on the sliding surface.

14. The component sliding mechanism according to claim 13, wherein the ejection guide track comprises
   a third tilt section extending from the third end in a third tilting direction such that the tilt direction track and the third tilt section constitutes a V-shape, and
   an upright section extending in a height direction along a height of the work vehicle from the third tilt section to the peripheral surface of the guide track.

15. The component sliding mechanism according to claim 1, wherein the guide track is separatable from the support deck.

16. The component sliding mechanism according to claim 1, wherein the component includes a radiator.

17. The component sliding mechanism according to claim 16, wherein the component includes a fan provided on the radiator.

18. The component sliding mechanism according to claim 17, wherein an engine of the work vehicle is provided such that the first end is provided between the engine and the second end.

* * * * *